United States Patent [19]

Kissin et al.

[11] Patent Number: 6,001,766

[45] Date of Patent: Dec. 14, 1999

[54] BIMETALLIC CATALYSTS FOR ETHYLENE POLYMERIZATION REACTIONS ACTIVATED WITH PARAFFIN-SOLUBLE ALKYLALUMOXANES

[75] Inventors: Yury V. Kissin, East Brunswick; Robert I. Mink, Warren; Thomas E. Nowlin, West Windsor, all of N.J.

[73] Assignee: Mobil Oil Corporation, Fairfax, Va.

[21] Appl. No.: 08/998,146

[22] Filed: Dec. 24, 1997

[51] Int. Cl.$^6$ ............ B01J 31/00; B01J 37/00; C08F 4/02; C08F 4/60
[52] U.S. Cl. ............ 502/115; 526/160; 526/943; 502/103; 502/117; 502/110; 502/111; 502/113; 502/125; 502/132; 502/133
[58] Field of Search ............ 556/175, 176, 556/179, 181, 182; 502/103, 110, 111, 113, 115, 117, 125, 132, 133

[56] References Cited

U.S. PATENT DOCUMENTS

| | | | |
|---|---|---|---|
| 2,924,593 | 2/1960 | Breslow | 260/94.9 |
| 4,378,304 | 3/1983 | Dombro | 252/429 B |
| 4,849,389 | 7/1989 | Nowlin et al. | 502/107 |
| 5,032,562 | 7/1991 | Lo et al. | 502/111 |
| 5,049,535 | 9/1991 | Resconi et al. | 502/117 |
| 5,157,008 | 10/1992 | Sangkoya et al. | 502/111 |
| 5,238,892 | 8/1993 | Chang | 502/111 |
| 5,330,951 | 7/1994 | Mink et al. | 502/115 |
| 5,332,706 | 7/1994 | Nowlin et al. | 502/107 |
| 5,561,091 | 10/1996 | Mink et al. | 502/115 |
| 5,608,019 | 3/1997 | Cheruvu et al. | 526/129 |
| 5,614,456 | 3/1997 | Mink et al. | 502/115 |
| 5,693,583 | 12/1997 | Hagerty et al. | 502/115 |
| 5,847,177 | 12/1998 | Sangokoya et al. | 502/117 |
| 5,849,653 | 12/1998 | Dall'Occo et al. | 502/117 |

FOREIGN PATENT DOCUMENTS

| | | | |
|---|---|---|---|
| 0 279 586 | 8/1988 | European Pat. Off. | 556/179 |
| 4-266891 | 9/1992 | Japan . | |
| WO 95/13871 | 5/1995 | WIPO . | |

OTHER PUBLICATIONS

PCT International Search Report, Feb. 16, 1999 (mailed) PCT/US98/24442.

*Primary Examiner*—Mark L. Bell
*Assistant Examiner*—J. Pasterczyk
*Attorney, Agent, or Firm*—Lori F. Cuomo; Dennis P. Santini

[57] ABSTRACT

Catalyst compositions for homopolymerization and copolymerization of ethylene which comprise two transition metal compounds, one of them a cyclopentadienyl complex of a transition metal and another a non-metallocene derivative of a transition metal are described. The catalysts are activated by alkylalumoxanes that are soluble in non-aromatic hydrocarbons. Bimetallic catalysts of this invention are suitable for the manufacture of ethylene homopolymers and copolymers with broad bimodal molecular weight distributions. The alkyl alumoxanes have at least one [AR(R)—O—] repeating group in which R is an alkyl group of at least two carbon atoms.

15 Claims, No Drawings

US 6,001,766

BIMETALLIC CATALYSTS FOR ETHYLENE POLYMERIZATION REACTIONS ACTIVATED WITH PARAFFIN-SOLUBLE ALKYLALUMOXANES

FIELD OF THE INVENTION

The invention relates to new bimetallic catalyst compositions for ethylene homopolymerization and copolymerization reactions. In particular, the invention relates to supported catalysts of this type and new methods of their synthesis. The new catalysts contain two transition metal components, at least one transition metal component containing at least one unsubstituted or substituted cyclopentadienyl group.

BACKGROUND OF THE INVENTION

Activation of cyclopentadienyl derivatives of transition metals with alkylalumoxanes was introduced to the art of catalysis in the mid-1970s by Kaminsky and Sinn (Angew. Chem., 88, 689 (1976)). Because these catalyst systems, when used in olefin polymerization reactors, exhibit a very strong response to hydrogen (molecular weights of polymers become greatly reduced in the presence of hydrogen), combinations of metallocene/alkylalumoxane catalyst systems with Ziegler-Natta catalyst systems provide a means of polymerizing olefins to products with broad molecular weight distributions. However, the preparation of the supported bicomponent (bimetallic) catalysts comprising metallocene/alkylalumoxane catalyst systems has a significant drawback: both the metallocene complexes and the alkylalumoxanes initially applied in the art require the use of aromatic compounds as solvents. Removal of aromatic solvents from the finished catalysts is a complex and time-consuming procedure. This invention was aimed at developing supported bimetallic catalyst systems which are synthesized in the absence of aromatic solvents and used in ethylene homopolymerization and copolymerization reactions with various alpha-olefins.

SUMMARY OF THE INVENTION

The invention relates to supported (or heterogeneous) catalysts which, in the as-synthesized form, are free-flowing particles. The catalysts comprise two transition metal compounds provided that at least one of them is a cyclopentadienyl compound of a transition metal, which may be a monocyclopentadienyl, biscyclopentadienyl or triscyclopentadienyl compound of a transition metal, in which the cyclopentadienyl group(s) may be unsubstituted or substituted as described below. The cyclopentadienyl transition metal component in the catalysts is activated by an alkylalumoxane of the formula: [—Al(R')—O—]$_a$[—Al(R")—O—]$_b$[—Al(R''')—O—]$_c$, where each of R', R" and R''' is the same or different $C_1$–$C_8$ alkyl group, with the proviso that the alkylalumoxane contains an alkyl other than methyl in an amount sufficient to solubilize the alumoxane in aliphatic solvents; These alumoxanes are soluble in alkanes, linear or branched, containing 4 to 10 carbon atoms, as well as in cycloalkanes. Bimetallic catalysts of this invention are suitable for the manufacture of ethylene homopolymers and copolymers with broad bimodal molecular weight distributions.

DETAILED DESCRIPTION OF THE INVENTION

The catalyst system of the invention comprises a contact product of an alkylaluminoxane which is soluble in non-aromatic hydrocarbons and the supported bimetallic catalyst precursor, the support being silica, or silica/alumina or alumina.

In general, the support for the catalyst precursor may be any carrier material which contains hydroxyl groups. The preferred support material for the catalyst precursor is a particulate, porous, preferably inorganic material, such as an oxide of silicon and/or of aluminum. The support material is used in the form of a dry powder having an average particle size of from about 1 micron to about 500 microns. The surface area of the support should be at least about 3 square meters per gram ($m^2/g$), and preferably from at least 50 $m^2/g$ up to 350 $m^2/g$. The support material should be dry, that is, free of absorbed water. Drying of the support material can be effected by heating it at about 100° C. to about 1000° C., preferably at about 600° C. When the support is silica, it is heated to at least 200° C., preferably about 400° C. to about 850° C., and most preferably at about 600° C. The support material must have at least some active hydroxyl (OH) groups on its surface to produce catalyst compositions of this invention. The number of OH groups on the support surface (silanol groups in the case of silica) is approximately inversely proportional to the temperature of drying or dehydration: the higher the temperature the lower the hydroxyl group content.

In the most preferred embodiment, the support is silica which, prior to the use thereof in the catalyst precursor synthesis, has been dehydrated by fluidizing it with nitrogen flow and heating at about 600° C. for about 4–16 hours to achieve a surface OH group concentration of about 0.7 millimoles per gram (mmol/g). The silica of the most preferred embodiment is a high surface area, amorphous silica (surface area=300 $m^2/g$; pore volume of 1.65 $cm^3/g$), and it is a material marketed under the tradenames of Davison 952 or Davison 955 by the Davison Chemical Division of W. R. Grace and Company or Crosfield ES70 by Crosfield Limited. The silica is in the form of spherical particles, which are obtained by a spray-drying process. As procured, these silicas are not calcined and thus must be dehydrated as indicated above.

The preferred synthesis of the supported bimetallic catalyst precursor of the invention consists of two stages, synthesis of the intermediate supported catalyst precursor and synthesis of the final supported catalyst precursor. The synthesis is carried out in a series of several consecutive steps under inert conditions in the absence of water and of oxygen.

Support material containing OH groups on their surface is slurried in a non-polar non-aromatic solvent. The slurry of the support material in the solvent is prepared by introducing the support into the solvent, preferably while stirring, and heating the mixture to about 25 to about 70° C., preferably to about 40 to about 60° C. Suitable non-polar solvents are materials which are liquid at reaction temperatures and in which all of the reactants used later during the catalyst precursor preparation, i.e., organomagnesium compounds and transition metal compounds, are at least partially soluble. Preferred non-polar solvents are alkanes, such as isopentane, hexane, isohexane, n-heptane, isoheptane, octane, nonane, and decane, although a variety of other materials including cycloalkanes, such as cyclohexane and methylcyclohexane can also be used. During the first stage of the catalyst synthesis, the manufacture of the intermediate catalyst precursor, aromatic solvents, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity. The temperature of the slurry is critical with respect to its impregnation with a non-metallocene transition metal compound; that is, temperatures of the slurry in excess of 90° C. result in deactivation of the transition metal component added subsequently. Accordingly, all catalyst precursor synthesis steps are conducted below 90° C.

In the second step, the slurry of the support is contacted with an organomagnesium compound.

The organomagnesium compound has the empirical formula $$(R^1)_m Mg(R^2)_n$$

where $R^1$ and $R^2$ are the same or different $C_2$–$C_{12}$ alkyl groups, preferably $C_4$–$C_{10}$ alkyl groups, more preferably $C_4$–$C_8$ alkyl groups, and most preferably both $R^1$ and $R^2$ are butyl groups, and m and n are each 0, 1 or 2, providing that m+n is equal to the valence of Mg.

In the most preferred embodiment of the synthesis of this catalyst precursor it is important to add only such an amount of the organomagnesium compound that will be deposited—physically or chemically—into the support since any excess of the organomagnesium compound in the liquid phase may react with other chemicals used for the catalyst synthesis and precipitate them outside of the support. The drying temperature of the support material affects the number of sites on the support available for the organomagnesium compound: the higher the drying temperature the lower the number of sites. Thus, the exact molar ratio of the organomagnesium compound to the OH groups in the support will vary and must be determined on a case-by-case basis to assure that only so much of the organomagnesium compound is added to the solution as will be deposited into the support without leaving any excess of the organomagnesium compound in the liquid phase. Thus, the molar ratios given below are intended only as an approximate guideline and the exact amount of the organomagnesium compound in this embodiment must be controlled by the functional limitation discussed above, i.e., it must not be greater than that which can be deposited into the support. If a greater amount of the organomagnesium compound is added to the slurry, the excess may react with the non-metallocene transition metal compound added to the slurry later, thereby forming a precipitate outside of the support which is detrimental in the synthesis of the catalyst precursor and must be avoided. The required amount of the organomagnesium compound can be determined in any conventional manner, e.g., by adding the organomagnesium compound to the slurry of the support until a free organomagnesium compound is detected in the liquid phase.

For example, for the silica support heated at about 600° C., the amount of the organomagnesium compound added to the slurry is such that the molar ratio of Mg to the OH groups on the support is about 0.5:1 to about 4:1, preferably about 0.8:1 to about 3:1, more preferably about 0.9:1 to about 2:1 and most preferably about 1:1.

Next, the support treated with the organomagnesium compound is contacted with an alcohol, ($R^3OH$) containing $R^3O$— groups which are capable of displacing alkyl groups on the magnesium atom. The amount of the alcohol is effective to provide a [$R^3OH$]:Mg molar ratio of 0.5 to 2.0, preferably 0.8 to 1.5. The reaction is carried out at a temperature ranging from 25° C. to 80° C., preferably 40° C. to 70° C.

The alkyl group $R^3$ in the alcohol can contain 1 to 12 carbon atoms, preferably 1 to 8 carbon atoms; in the embodiments below, they are alkyl groups containing 2 to 4 carbon atoms, particularly 4 carbon atoms. The inclusion of the alcohol step in the catalyst precursor synthesis produces a catalyst composition which, relative to the catalyst precursor prepared without this step, is much more active, requires much less non-transition metal (e.g., titanium), and does not interfere with the performance of the metallocene component in the catalyst.

Next, the slurry is contacted with a non-metallocene transition metal compound. During this step, the slurry temperature must be maintained at about 25 to about 70° C., preferably at about 40 to about 60° C. As noted above, temperatures in this slurry of about 90° C. or greater result in deactivation of the non-metallocene transition metal component. Suitable transition metal compounds used herein are compounds of metals of Groups 4, and 5, of the Periodic Chart of the Elements, as published by Chemical and Engineering News, 63(5), 27, 1985, providing that such compounds are soluble in non-polar solvents. Non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is $TiCl_4$. The amount of titanium (or vanadium) ranges from a Ti/Mg molar ratio of 0.3 to 1.5, preferably from 0.50 to 0.80.

Mixtures of such transition metal compounds may also be used and generally, no restrictions are imposed on the transition metal compounds which may be included. Any transition metal compound that may be used alone may also be used in conjunction with other transition metal compounds.

After the addition of the transition metal compound is complete, in one embodiment of catalyst synthesis, the slurry solvent is removed by evaporation or filtering to obtain a free-flowing powder of an intermediate catalyst precursor. Next, incorporation of a metallocene component into the intermediate precursor is undertaken. The metallocene component is deposited (or impregnated) into the catalyst precursor in the form of a complex of an alkylaluminum compound and a metallocene complex of a transition metal of the formula $Cp_xMA_yE_z$; In this formula, Cp represents unsubstituted or substituted cyclopentadienyl group, M is a transition metal selected from the group consisting of Group 4 metals such as titanium, zirconium and hafnium, and each of A and G is a halogen atom, an alkyl group, or a hydrogen atom and A and G may be the same or different.

In the above formula of the metallocene complex, the preferred transition metal atom M is zirconium. In the above formula of the metallocene compound, the Cp group is an unsubstituted, a mono-, di- or a polysubstituted cyclopentadienyl group: x is at least 1 and preferably is 2; and x+y+z equals the valence of M. The substituents on the cyclopentadienyl group can be preferably linear $C_1$–$C_6$ alkyl groups. The cyclopentadienyl groups can also be part of bicyclic or a tricyclic moieties such as indenyl, tetrahydroindenyl, fluorenyl or a partially hydrogenated fluorenyl group, as well as part of substituted bicyclic or tricyclic moieties. In the case when x in the above formula of the metallocene compound is equal to 2, the cyclopentadienyl groups can be also bridged by polymethylene or dialkylsilane groups, such as —$CH_2$—, —$CH_2$—$CH_2$, —$CR^4R^5$— and —$CR^4R^5$—$CR^4R^5$— where $R^4$ and $R^5$ are short alkyl groups or hydrogen atoms, —$Si(CH_3)_2$—, —$Si(CH_3)_2$—$CH_2$—$CH_2$—Si ($CH_3$)$_2$— and similar bridge groups. If the A and G substituents in the above formula of the metallocene complex are halogen atoms, they belong to the group of fluorine, chlorine, bromine or iodine; and y+z is 3 or less. If the substituents A and G in the above formula of the metallocene complex are alkyl groups, they are preferably linear or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include:
bis(cyclopentadienyl)metal dihalides,
bis(cyclopentadienyl)metal hydriohalides,
bis(cyclopentadienyl)metal monoalkyl monohalides,
bix(cyclopentadienyl)metal dialkyls
and bis(indenyl)metal dihalides
wherein the metal is zirconium, titanium, or hafnium atom, halide atoms are preferably chlorine and the alkyl groups are $C_1$–$C_6$ alkyl groups. Illustrative but non-limiting examples of metallocenes complexes include
bis(cyclopentadienyl)zirconium dichloride,
bis(cyclopentadienyl)titanium dichloride,
bis(cyclopentadienyl)hafnium dichloride,
bis(cyclopentadienyl)zirconium dimethyl,
bis(cyclopentadienyl)hafnium dimethyl,
bis(cyclopentadienyl)zirconium hydridochloride,
bis(cyclopentadienyl)hafnium hydridochloride,
bis(n-butylcyclopentadienyl)zirconium dichloride,
bis(n-butylcyclopentadienyl)hafnium dichloride,
bis(n-butylcyclopentadienyl)zirconium dimethyl,
bis(n-butylcyclopentadienyl)hafnium dimethyl,
bis(n-butylcyclopentadienyl)zirconium hydridochloride,
bis(n-butylcyclopentadienyl)hafnium hydridochloride,
bis(1,3-dimethylcyclopentadienyl)zirconium dichloride,
bis(pentamethylcyclopentadienyl)zirconium dichloride,
cyclopentadienylzirconium trichloride,
bis(indenyl)zirconium dichloride,
bis(4,5,6,7-tetrahydro-1-indenyl)zirconium dichloride, and
ethylene [bis(4,5,6,7-tetrahydro-1-indenyl)]zirconium dichloride.

As was indicated, prior to impregnation into the intermediate catalyst precursor, the $Cp_xMA_yG_z$ compound is contacted with an alkylaluminum compound, preferably a trialkyaluminum compound. The molar ratios of the $Cp_xMA_yG_z$ and the alkylaluminum compounds are from 0.005 to 2.0, preferably from 0.01 to 1.0.

Contact of these two components is undertaken in a non-aromatic solvent. The volume of the solvent is sufficient to produce a solution. The solvents which can be used for this purpose include paraffins of 4 to 10 carbon atoms, linear or branched, and are exemplified by n-hexane, isohexane, n-heptane, etc., and their mixtures, as well as cycloalkanes such as methylcyclopentane, cyclohexane, methylcyclohexane, etc. In the specific embodiments described below, the solvents are free of any aromatic hydrocarbons. Although the $Cp_xMA_yG_z$ complexes used in the course of the preparation of catalyst precursors of the invention have, by themselves, very low solubilities in non-aromatic hydrocarbons, their contact products with alkylaluminum compounds are soluble in non-aromatic hydrocarbons.

The alkylaluminum compounds, preferably trialkyaluminum compounds, which are contacted with the $Cp_xMA_yG_z$ compounds are characterized by the formula $Al(R^6)(R^7)(R^8)$, wherein each of $R^6$, $R^7$, and $R^8$ is an alkyl group, linear or branched, containing 1 to 10 carbon atoms; and each of $R^6$, $R^7$, and $R^8$ is the same or different group. The alkyl groups can be methyl, ethyl, propyl, isopropyl, butyl, isobutyl, pentyl, isopentyl, hexyl, isohexyl, heptyl, isoheptyl, octyl, or isooctyl. Most preferably, this alkylaluminum compound is trimethylaluminum. The molar ratio of the trialkylaluminum compound to the $Cp_xMA_yG_z$ compound can range from 0.50 to 50, preferably from 1.0 to 20 and most preferably from 2.0 to 15. The alkylaluminum compound contacts with the $Cp_xMA_yG_z$ complex in the absence of alumoxanes. When catalyst precursors of the invention contain two $Cp_xMA_yG_z$ compounds they may be contacted individually or separately with the trialkylaluminum compound.

The dried intermediate catalyst precursor is reslurried in a non-polar hydrocarbon (the same as the solvent used for the preparation of the initial support slurry) and is contacted with the solution containing a complex of $Cp_xMA_yG_z$ and an alkylaluminum compound in a non-aromatic hydrocarbon. The contact is carried out at temperatures ranging from 20 to 60° C. and lasts from 10 to 120 min. After that, the combined hydrocarbon solvent mixture is removed by evaporation and the final bimetallic catalyst precursor in the free-flowing particulate form is isolated. As clear from the above description, in preferred embodiments described below, the catalyst precursors of the invention contain two different transition metal components, at least one of which is a derivative of the formula $Cp_xMA_yG_z$ described above.

Therefore, the catalyst composition of the invention can be described as a supported (or heterogeneous) catalyst which comprises 0.01 to 3.0 wt. %, preferably 0.08 to 1.0 wt. % of a transition metal provided by a metallocene complex of a transition metal and 0.5 to 5.0 wt. % of a transition metal provided by a non-metallocene compound of a transition metal.

Activation of the precursor containing at least two transition metals may be undertaken prior to introduction to gas phase or slurry polyolefin reactors. However, preferably the activation occurs in the reactor, e.g. the fluidized-bed gas phase reactor. Activation is effected with a composition comprising the alkylalumoxane which is soluble in non-aromatic hydrocarbon mediums.

The term "alkylalumoxane" refers to a class of alkylalumoxane oligomers which includes methylalumoxane. Methylalumoxane (MAO) has been widely used as a co-catalyst for metallocene complexes. MAO is routinely used as a solution in toluene, or in other aromatic solvents, because it is not soluble in linear or branched aliphatics, e.g. linear or branched alkanes.

In contrast, the alkylalumoxanes which are used in accordance with the invention are soluble in aliphatics (alkanes, alkenes and alkynes) of 4 to 10 carbon atoms, e.g., alkanes of 4 to 10 carbon atoms. These alkylalumoxanes contain at least one alkyl substituent which contains at least two carbon atoms and comprise oligomeric linear and/or cyclic alkylalumoxanes represented by generic formulae: R—[(Al(R)—O]$_n$ —$AlR_2$ for oligomeric, linear alumoxanes and [—Al(R)—O—]$_m$ for oligomeric cyclic alumoxanes. Since these are soluble in aliphatics, the catalyst synthesis can be aromatic-free, e.g., toluene free. More particularly, the oligomeric alumoxanes of this invention are characterized by the formula [—Al(R')—O—]$_a$[—Al(R")—O—]$_b$[—Al(R'"—O—]$_c$, in which each of $R_1$, $R_2$, and $R_3$, is the same or different $C_1$–$C_8$ alkyl group, wherein a+b+c is 3–100, preferably 3–40 and at least one of the R', R" and R'" groups is an alkyl group of at least two carbon atoms. The alkylalumoxane is soluble in alkanes, alkenes, linear or branched, containing 4 to 10 carbon atoms, and in cycloalkanes. The solubility can be 2 to 20 weight percent alkylalumoxane (based on the combined weight of alkylalumoxane and aliphatic solvent.) In particular, each of the R', R", and R'", groups can be methyl, ethyl, propyl, isopropyl, butyl, isobutyl, tertbutyl, pentyl, isopentyl, hexyl, isohexyl, heptyl, isoheptyl, octyl, isooctyl and at least one of the R', R" and R'" groups is an alkyl group of at least two carbon atoms. These alkylalumoxanes can be prepared as, for example, in U.S. Pat. No. 5,157,008. They are also commercially available from Akzo Nobel.

In the embodiments described below, the alumoxane contains isobutyl and methyl groups and is sold by Akzo Nobel Chemical Corporation with a typical analysis of 27.5% isobutyl and 71.1% methyl groups. The presence of the isobutyl groups renders the alumoxane species soluble in aliphatic hydrocarbons such as isopentane and heptane.

Preferably, the alkylalumoxane is admixed with an alkylaluminum compound, preferably a trialkyaluminum compound. Each alkyl group of the trialkylaluminum compound may be the same or different and contains 1 to 10 carbon atoms. Examples of trialkylaluminum compounds can be trimethylaluminum, triethylaluminum, tripropylaluminum, tributylaluminum, triisobutylaluminum, trihexylaluminum, and trioctylaluminum. The amount of the two components is sufficient to provide a trialkylaluminum:alkylalumoxane ratio of 0.1 to 50, preferably 0.1 to 30; in the examples the ratio is 2 to 6.7.

When used under ethylene homopolymerization and copolymerization conditions, the two transition metal components differ from each other in their hydrogen response (ability to control molecular weights of polymers in the presence of hydrogen). Accordingly, under the conditions of ethylene polymerization, the difference in the hydrogen response will result in the production of at last two polymer components with different molecular weights within a single catalyst particle. Such polymerization products have bimodal or broad molecular weight distributions.

The catalyst compositions of the invention, comprising solid supported bimetallic catalyst precursors and alkylalumoxanes soluble in non-aromatic hydrocarbons, can be used in fluidized-bed processes, or slurry or solution process, for olefin polymerization or copolymerization reactions. Polymerization temperatures should be below 300° C. and pressures below 1000 psi. With respect to the fluidized-bed process, it is essential to operate the fluidized-bed reactor at a temperature below the sintering temperature of the polymer particles. For the production of ethylene copolymers in the process of the present invention, an operating temperature of about 30° C. to 115° C. is preferred, and a temperature of about 75° to 95° is most preferred. Temperatures of about 60° C. to 90° C. are used to prepare polyethylene resins having a density of about 0.91 to 0.92, and temperatures of about 70° C. to 100° C. are used to prepare resins having a density of about 0.92 to 0.94, and temperatures of about 80° C. to 115° C. are used to prepare resins having a density of about 0.94 to 0.96.

The fluidized-bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

Hydrogen is used as a chain transfer agent in the polymerization reaction with the catalysts of the present invention. The ratio of hydrogen/ethylene employed will vary between about 0 to about 2.0 moles of hydrogen per mole of ethylene.

Polymerization products produced with the catalyst compositions of this invention comprise at least two components of different molecular weights (MW), with one component being of relatively higher molecular weight than the other. The component with a relatively higher molecular weight has a relatively narrow molecular weight distribution (MWD). The bimetallic catalyst systems of this invention produce polyethylene resins with broad bimodal MWDs in which the low MW component in the resin is provided by the metallocene active centers, while the high MW component is produced by the non-metallocene transition metal centers. These bimodal resins, when processed into a film by the film-blowing technique, exhibit better bubble stability compared to resins produced with other catalysts in which the MWD of the high MW component is relatively broad. Bubble stability is a prerequisite for the use of the resin products in high-stalk extrusion film equipment operating under commercially acceptable rates.

The film manufactured with resins produced with the catalysts of this invention exhibits excellent dart drop impact strength as measured by ASTM D 1709 method.

Ethylene homopolymers, as well as copolymers of ethylene with one or more $C_3$–$C_{10}$ alpha-olefins, can be produced in accordance with the invention. Thus, copolymers having one type of alpha-olefin unit are possible as well as terpolymers having two types of alpha-olefin units. Particular examples of such polymers include ethylene/1-butene copolymers, ethylene/1-hexene copolymers and ethylene/4-methyl-1-pentene copolymers.

EXAMPLES

In the Examples below, MMAO refers to an alkylalumoxane sold by Akzo Nobel Chemical Corporation. It contains 28% of isobutyl groups and 72% of methyl groups. The metallocene compound used was bis(n-butylcyclopentadienyl)zirconium dichloride, (n-BuCp)$_2$ZrCl$_2$.

Example 1

Into a Schlenk flask were added Davison-grade 955 silica (2.00 g), which was previously calcined at 600° C. for 4 hours, and n-heptane (60 ml). The flask was placed into an oil bath (55° C.). Dibutylmagnesium in the amount of 1.44 mmol was added to the stirred silica slurry at 55° C. and stirring was continued for 1 hour. Then, 1-butanol (1.368 mmol) was added at 55° C. to the slurry and the mixture was stirred for additional 1 hour. Finally, TiCl$_4$ (0.864 mmol) was added at 55° C. to the reaction medium and stirring was continued for 1 hour more. The liquid phase of the slurry was removed by evaporation under nitrogen flow to yield an off-white free-flowing powder of an intermediate catalyst precursor. This powder (2.50 g) was then reslurried in n-heptane (50 ml) and the slurry was heated to 50° C. Then, a heptane solution of a zirconocene complex, which was prepared in a separate vessel by contacting trimethylaluminum (TMA), 5.00 mmol, in heptane (~4 ml) with (n-BuCp)$_2$ ZrCl$_2$ (0.100 mmol, 0.0404 g), was added to the slurry of the intermediate catalyst precursor. After stirring the mixture at ~50° for 0.6 hours, the liquid phase of the slurry was removed by evaporation under nitrogen flow to yield a brown free-flowing powder.

Example 2

Same as Example 1 except triethyaluminum (TEAL), 5.00 mmol, was used instead of TMA.

Example 3

Same as Example 1 except triisobutylaluminum (TIBA), 5.00 mmol, was used instead of TMA.

Example 4

Metallocene Complexes Soluble in Paraffinic Liquids

Metallocene complexes such as (n-BuCp)$_2$ZrCl$_2$ have a very limited solubility in paraffinic solvents. However, when contacted with trialkylaluminum compounds, some metallocene complexes form products which are readily soluble in paraffinic and cycloparaffinic solvents. The $^{13}$C NMR spectra for the TMA/(n-BuCp)$_2$ZrCl$_2$ and TEAL/(n-BuCp)$_2$ZrCl$_2$ products in heptane solutions were recorded in the following procedure.

In the first experiment, 0.230 mmol (0.0933 g) of (n-BuCp)$_2$ZrCl$_2$ was added to an NMR tube, flushed with nitrogen followed by addition of 2 ml of n-heptane. The metallocene complex did not dissolve in heptane. Then, 2.3 ml of TMA solution in heptane (1.70 mmol) was added to the tube. The metallocene complex quickly dissolved. The $^{13}$C NMR spectrum of the solution was recorded and compared to the spectrum of pure (n-BuCp)$_2$ZrCl$_2$ (recorded as a solution in deuterated chloroform). The spectrum of the contact product from (n-BuCp)$_2$ZrCl$_2$ and TMA contains eight signals in the Cp carbon atom area at −135.5, −131.7, −117.0, —114.8, —112.5, −112.0, −110.6, and −108.9 ppm whereas the spectrum of (n-BuCp)$_2$ZrCl$_2$ itself contains only three signals at −135.2, −116.8, and −112.4 ppm. The difference proves that the (n-BuCp)$_2$ZrCl$_2$/TMA contact product is a unique entity.

In the second experiment, 0.272 mmol (0.110 g) of (n-BuCp)$_2$ZrCl$_2$ was contacted with 2.0 ml of TEAL solution in heptane (3.06 mmol). The metallocene complex rapidly dissolved. The $^{13}$C NMR spectrum of the solution contains fifteen signals in the Cp carbon atom area encompassing the −126.2 to 101.4 ppm range. The difference with the spectrum of pure (n-BuCp)$_2$ZrCl$_2$ proves that the (n-BuCp)$_2$ZrCl$_2$/TEAL contact product is also a unique entity.

Example 5

Slurry Polymerization Reactions

Ethylene/1-hexene copolymers were prepared with the bimetallic catalyst precursors and the cocatalyst mixture of MMAO and a trialkylaluminum compound.

A 1.6 liter stainless-steel autoclave equipped with a magnet-drive impeller stirrer was filled with heptane (750 ml) and 1-hexene (30 ml) under a slow nitrogen purge at 50° C. and then a trialkylaluminum compound and MMAO were added. The reactor vent was closed, the stirring was increased to 1000 rpm, and the temperature was increased to 95° C. The internal pressure was raised 6.0 psi with hydrogen and then ethylene was introduced to maintain the total pressure at 200–210 psig. After that, the temperature was decreased to 85° C., 20.0–35.0 mg of the bimetallic catalyst precursor was introduced into the reactor with ethylene over-pressure, and the temperature was increased and held at 95° C. The polymerization reaction was carried out for 1 hour and then the ethylene supply was stopped. The reactor was cooled to ambient temperature and the polyethylene was collected.

The polymerization results for these catalyst systems are given below:

| Catalyst Precursor | Cocatalyst Mixture: R$_3$Al (mmol); MMAO (mmol) | Productivity g/g cat-h | Flow Index I$_{21.6}$ | MFR- I$_{21.6}$/I$_{2.16}$ |
|---|---|---|---|---|
| Example 1 | TMA (2.0); MMAO (0.3) | 4640 | 26.7 | 136 |
| Example 1 | TMA (1.0); MMAO (0.5) | 9500 | 963 | 94 |
| Example 1 | TEAL (1.0); MMAO (0.5) | 2840 | 1.6 | 46 |
| Example 1 | TEAL (1.0); MMAO (0.8) | 3590 | 2.0 | 45 |
| Example 1 | TIBA (1.0); MMAO (0.5) | 3690 | 6.9 | 111 |
| Example 2 | TMA (2.0); MMAO (0.3) | 1200 | 13.3 | 90 |
| Example 2 | TMA (1.0); MMAO (0.5) | 1980 | 41.5 | 157 |
| Example 2 | TEAL (1.0); MMAO (0.5) | 950 | 1.3 | 38 |
| Example 2 | TIBA (1.0); MMAO (0.5) | 1380 | 3.0 | 59 |
| Example 3 | TMA (1.0); MMAO (0.5) | 3880 | >1000 | — |
| Example 3 | TEAL (1.0); MMAO (0.5) | 1120 | 2.0 | 53 |
| Example 3 | TIBA (1.0); MMAO (0.5) | 1800 | 22.9 | 197 |

Each of the I$_{2.16}$ and I$_{21.6}$ values was measured according to ASTM D-1238 conditions E and F.

The catalyst systems of this invention produce resins with broad bimodal MWDs, as judged by high I$_{21.6}$/I$_{12.16}$ ratios. Relative contributions of the high MW and low MW components to the make-up of the polymer products prepared with these catalysts can be judged by the flow index of the resins: the higher the flow index, the higher the contribution of the low MW component. The fraction of the low MW component depends primarily upon the nature of the trialkylaluminum compound in the cocatalyst mixture. For a given catalyst precursor, the cocatalyst mixture TMA/MMAO generates more of the low MW component than the cocatalyst mixture TIBA/MMAO, while the cocatalyst mixture TEAL/MMAO produces very little of the low MW component, as evident from the very low flow indexes of the resins. To a lesser extent, the fraction of the low MW component also depends upon the nature of the trialkylaluminum compound used in the preparation of the catalyst precursor: The efficiency of the metallocene component in the case of the TMA and TIBA-based catalyst precursors is significantly higher than that of the corresponding TEAL-based precursors.

Thus it is apparent that there has been provided, in accordance with the invention a synthesis that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A bimetallic catalyst composition suitable for producing homopolymers or copolymers of ethylene with broad molecular weight distributions and produced in a series of steps comprising:
    (i) forming a first slurry of a support material containing hydroxyl groups in a non-polar solvent,
    (ii) adding to the first slurry of step (i) a dialkylmagnesium compound,
    (iii) adding to the slurry of step (ii) an alcohol,
    (iv) adding to the slurry of step (iii) a non-metallocene compound of a transition metal,
    (v) drying the slurry of step (iv) and recovering an intermediate catalyst precursor,
    (vi) forming a second slurry of the intermediate of step (v) with a non-polar, non-aromatic solvent,
    (vii) contacting, in a non-polar, non-aromatic solvent, a metallocene compound of the formula Cp$_x$MA$_y$G$_z$ wherein x is 1 or 2, M is titanium, zirconium or hafnium, Cp is a cyclopentadienyl group, a substituted cyclopentadienyl group, a cyclopentadienyl group that is part of a bicyclic or tricyclic moiety or, when x is 2, the cyclopentadienyl groups are bridged between each other, and each of A and G is selected from the group consisting of a halogen atom, a hydrogen atom, an alkyl group, and combinations thereof, providing that x+y+z is equal to the valence of M;

and an alkylaluminum compound of the formula $Al(R^6)(R^7)(R^8)$, wherein each of $R^6$, $R^7$ and $R^8$ is an alkyl group, linear or branched containing 1 to 10 carbon atoms; and each of $R^6$, $R^7$ and $R^8$ is the same or different;

the contact resulting in dissolving of said metallocene compound in said non-aromatic solvent, (viii) adding the solution of step (vii) to the second slurry of step (vi), (ix) removing the liquid phase from the slurry of step (viii) by drying and recovering a bimetallic catalyst precursor, (x) contacting the catalyst precursor of step (ix) with a cocatalyst which consists of an alkylalumoxane with an empirical formula:

[—Al(R')—O—]$_a$[—Al(R")—O—]$_b$[—Al(R''')—O—]$_c$, wherein each of R', R" and R''' is the same or different and is a $C_1$–$C_8$ alkyl group, and at least one of R', R" and R''' is an alkyl group of at least two carbon atoms, and a+b+c is equal to 3 to 100; said alkylalumoxane being soluble in non-polar, non-aromatic solvents.

2. The catalyst composition of claim 1, wherein x is 2.

3. The catalyst composition of claim 1, wherein each of $R^6$, $R^7$, and $R^8$ is selected from the group consisting of methyl, ethyl, propyl, isopropyl, n-butyl, isobutyl, n-pentyl, isopentyl, n-hexyl, isohexyl, n-heptyl, isoheptyl, octyl, and isooctyl groups.

4. The catalyst composition of claim 1, wherein $Al(R^6)(R^7)(R^8)$ is trimethylaluminum and its molar ratio to transition metal compound provided by the metallocene compound, ranges from 0.50 to 200.

5. The catalyst component of claim 1, wherein the support is silica calcined at a temperature in the range of 250 to 800 degrees C.

6. The catalyst composition of claim 1 where the dialkylmagnesium component used in step (ii) is dibutylmagnesium.

7. The catalyst composition of claim 1 where the alcohol used in step (iii) is n-butanol.

8. The catalyst composition of claim 1 where the non-metallocene transition metal compound used in step (iv) is titanium tetrachloride.

9. The catalyst composition of claim 1 where the metallocene compound used in step (vii) is bis(n-butylcyclopentadienyl)zirconium dichloride.

10. The catalyst composition of claim 1 where the solvent used in step (vii) is selected from the group consisting of n-pentane, isopentane, n-hexane, methylcyclopentane, isohexanes, cyclohexane, n-heptane, methylcyclohexane, and isoheptanes.

11. A process for preparing a bimetallic catalyst comprising the steps of:

(i) forming a first slurry of a support material containing hydroxyl groups in a non-polar solvent, (ii) adding to the first slurry of step (i) a dialkylmagnesium compound, (iii) adding to the slurry of step (ii) an alcohol, (iv) adding to the slurry of step (iii) a non-metallocene compound of a transition metal, (v) drying the slurry of step (iv) and recovering an intermediate catalyst precursor, (vi) forming a second slurry of the intermediate of step (v) with a non-polar, non-aromatic solvent, (vii) contacting, in a non-polar, non-aromatic solvent, a metallocene compound of the formula $Cp_xMA_yG_z$ wherein x is 1 or 2, M is titanium, zirconium or hafnium, Cp is a cyclopentadienyl group, a substituted cyclopentadienyl group, a cyclopentadienyl group that is a part of a bicyclic or a tricyclic moiety or, when x is 2, the cyclopentadienyl groups are bridged between each other, and each of A and G is selected from the group consisting of a halogen atom, a hydrogen atom, an alkyl group, and combinations thereof providing that x+y+z is equal to the valence of M;

and an alkylaluminum compound of the formula $Al(R^6)(R^7)(R^8)$, wherein each of $R^6$, $R^7$ and $R^8$ is an alkyl group, linear or branched containing 1 to 10 carbon atoms; and each of $R^6$, $R^7$ and $R^8$ is the same or different; the contact resulting in dissolving of said metallocene compound in said non-aromatic solvent, (viii) adding the solution of step (vii) to the second slurry of step (vi), (ix) removing the liquid phase from the slurry of step (viii) by drying and recovering [the] a bimetallic catalyst precursor, (x) contacting the catalyst precursor of step (ix) with a cocatalyst which consists of an alkylalumoxane with an empirical formula: [—Al(R')—O—]$_a$[—Al(R")—O—]$_b$[—Al(R''')—O—]$_c$, wherein each of R', R' and R''' is the same or different and is a $C_1$–$C_8$ alkyl group, and at least one of R', R" and R''' is an alkyl group of at least two carbon atoms, and a+b+c is equal to 3 to 100; said alkylalumoxane being soluble in non-polar, non-aromatic solvents.

12. The bimetallic catalyst of claim 1 in which the step (vii) of contacting consists essentially of contacting the metallocene and the alkylaluminum compound.

13. The bimetallic catalyst of claim 1 in which the step (vii) of contacting is in the absence of alumoxane.

14. The process of claim 11 in which the step (vii) of contacting consists essentially of contacting the metallocene and the alkyl aluminum compound.

15. The process of claim 11 in which the step (vii) of contacting is in the absence of alumoxane.

* * * * *